Aug. 4, 1970 W. W. LYTLE 3,522,921
CLAMP FOR PIPE SUPPORT
Filed July 18, 1968
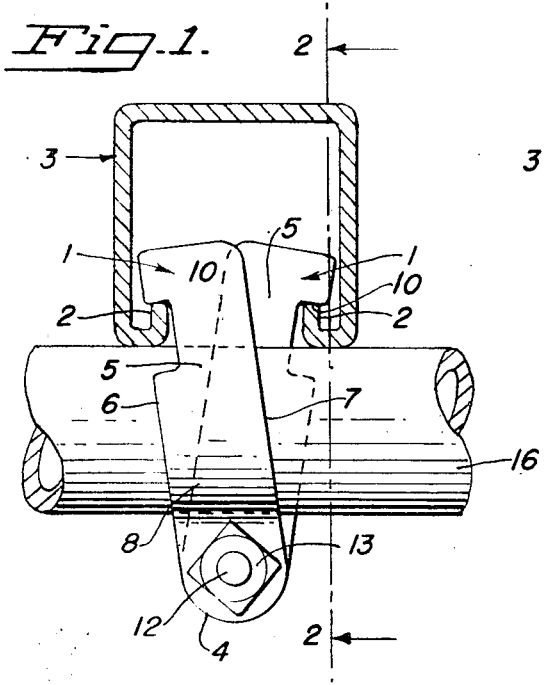
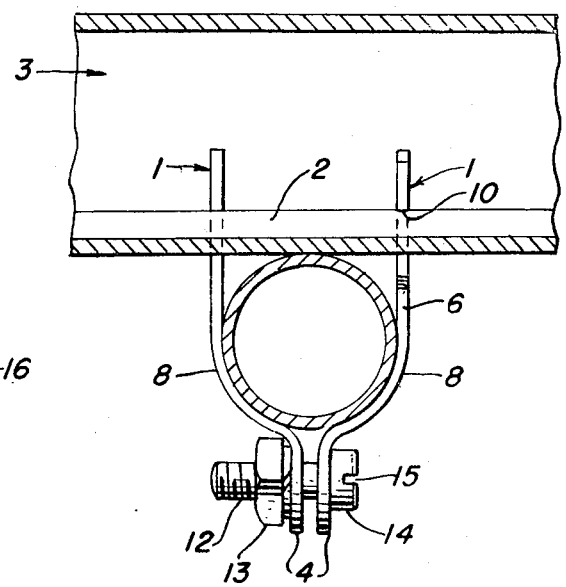
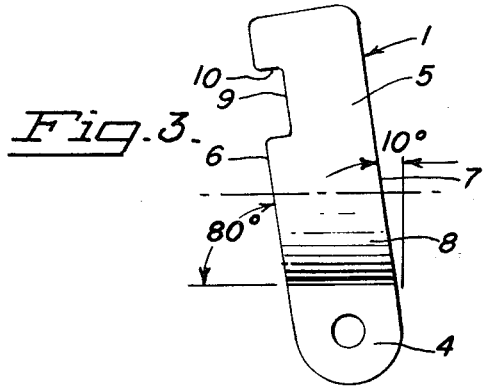
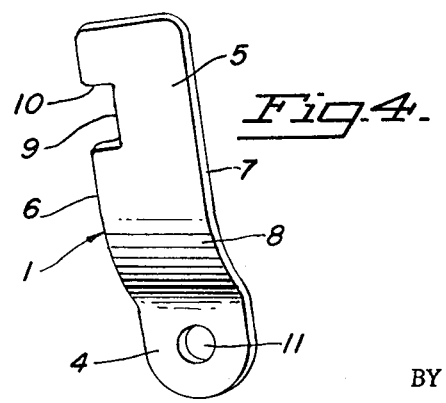
INVENTOR
WALTER W. LYTLE
BY *George B. White*
ATTORNEY United States Patent Office 3,522,921
Patented Aug. 4, 1970

3,522,921
CLAMP FOR PIPE SUPPORT
Walter W. Lytle, San Francisco, Calif., assignor to Superior Strut & Hanger Co., Inc., a corporation of California
Filed July 18, 1968, Ser. No. 745,826
Int. Cl. F16l 3/10
U.S. Cl. 248—62                    4 Claims

ABSTRACT OF THE DISCLOSURE

A pair of complemental clamping plates assembled by a suitable bolt through securing flanges at one end. At the other end of each plate is a hooking end provided with a suitable recess at its edge to form a hook engageable with a flange of a support. Near the securing flange of each plate is formed a pipe seat of about quarter-cylindrical shape, so that the included angle between the axis of the seats and the hooking edge of each plate is less than ninety degrees, therefore when the pipe is nested in the seats the plates slant in opposite directions relatively to the axis of the plate for hooking on the opposite support flanges.

BACKGROUND OF THE INVENTION

Clamps are used to secure pipes to structural members, such as the inturned flanges of a channel. Clamping devices which are put together when placed on the pipe require awkward manipulation. The primary object of this invention is to provide clamping plates which are pre-assembled so that when placed over a pipe, the opposite plates lean or slant edgewise in opposite directions at such angles that the hooks on the opposite outer edges of the plates automatically hook over the opposite supporting flanges, when inserted between said flanges, leaving the hands of the operator free to secure together tightly the exposed securing ends of the assembly.

DESCRIPTION OF FIGURES

FIG. 1 is a side view of the assembled clamp plates, the channel being shown in section.

FIG. 2 is a cross-sectional view of the channel and pipe and edge view of the clamping plates.

FIG. 3 is a detail side view of one of the clamp plates.

FIG. 4 is a perspective view of one of the clamp plates.

DETAILED DESCRIPTION

Each clamping plate 1 is formed of a strip of metal substantially narrower than the spacing between supporting flanges 2 which latter are formed by inturned longitudinal edges of a channel 3.

Each clamping plate 1 has a securing flange 4 at one end in a plane generally parallel with the plane of the hooking portion 5 adjacent the hooking end of the plate 1 so that opposite edges 6 and 7 are substantially parallel throughout the length of the plate 1.

The securing flange 4 is offset to one side of the plane of the hooking portion 5 of the plate 1. The pipe nesting portion or seat 8 between the flat portion 5 and the securing flange 4 is curved or dished so as to form a generally quarter-cylindrical seat for the pipe. The included angle between the axis of the pipe seat 8 and the inclined plate edge 6 is less than ninety degrees. Accordingly when the assembled plates are placed over a pipe, the plates slant or incline in opposite directions at opposite acute angles, in the herein illustration 10°.

On the lower edge 6 of the hooking portion 5 of each plate 1 is a recess 9 the shoulder 10 of which is adapted to hook over the edge of the adjacent flange 2.

The securing flanges 4 have registering holes 11 through which extends a securing element, such as a bolt 12 held in place by a nut 13. The bolt head 14 has a slot 15 so that the clamp can be easily tightened by a screwdriver. The plates 1 are held assembled by the bolt ready to receive a pipe 16 therebetween in the curved seats 8, whereupon the plates 1 assume their oppositely inclined attitude shown in FIG. 1, so that the hook shoulders 10 hook over the respective flanges 2.

The plates 1 of this invention are considerably narrower than the width of the channel and due to the angular offset of the pipe seats, the symmetrical facing plates slant in opposite directions at predetermined angles for easy hooking over the flanges.

I claim:
1. In a pipe clamp,
  (a) a pair of strip plates,
  (b) securing means at adjacent securing ends of the plates for pivotally holding said plates assembled,
  (c) a hook on the edge at the other end of each plate farthest from the other plate for hooking over a structural support,
  (d) a pipe seat formed between the hooking end and the securing end transversely in each plate at an acute included angle with the longitudinal axis of the plate, thereby to position the opposite plates on the pipe slanting edgewise in opposite directions with their hooking ends diverging for engagement with spaced opposite supports.
2. The invention defined in claim 1, and
  (e) the pipe seat in each plate being formed by a quarter cylindrical bend between the hooking end and the securing end, and said plate being offset edgewise toward said hook at an acute angle to said seat axis.
3. The invention defined in claim 2, and
  (f) said securing means including a flange below each seat offset from the plane of said plate,
  (g) and means pivotally to clamp said flanges together.
4. The invention defined in claim 3, and
  (h) the edges of each plate being substantially parallel from end to end.

References Cited

UNITED STATES PATENTS 2,549,346   4/1951   Tormo _____ 248—58
2,863,625   12/1958  Attwood _____ 248—73 X

FOREIGN PATENTS 178,697   3/1962   Sweden.
318,370   2/1957   Switzerland.

CHANCELLOR E. HARRIS, Primary Examiner

U.S. Cl. X.R.
248—72, 73